United States Patent
Yan et al.

(10) Patent No.: US 9,172,807 B2
(45) Date of Patent: Oct. 27, 2015

(54) TECHNIQUES FOR CUSTOMER RELATIONSHIP MANAGEMENT

(75) Inventors: Steven Kai-Man Yan, San Francisco, CA (US); Adrian Peter McDermott, San Francisco, CA (US); Shajith Chacko Thengumoottil, Sunnyvale, CA (US); Henry Hsu, Fremont, CA (US)

(73) Assignee: Zendesk, Inc., San Francisco, CA (US)

( * ) Notice: Subject to any disclaimer, the term of this patent is extended or adjusted under 35 U.S.C. 154(b) by 0 days.

(21) Appl. No.: 13/610,771

(22) Filed: Sep. 11, 2012

(65) Prior Publication Data

US 2013/0163731 A1    Jun. 27, 2013

Related U.S. Application Data

(60) Provisional application No. 61/533,252, filed on Sep. 11, 2011.

(51) Int. Cl.
*H04M 3/00* (2006.01)
*H04M 3/523* (2006.01)
*G06F 9/44* (2006.01)

(52) U.S. Cl.
CPC .............. *H04M 3/523* (2013.01); *G06F 9/4445* (2013.01); *H04M 2203/408* (2013.01)

(58) Field of Classification Search
CPC ................................. H04M 3/523; H04M 3/51
USPC ......................................... 379/265.01, 265.02
See application file for complete search history.

(56) References Cited

U.S. PATENT DOCUMENTS

| | | | |
|---|---|---|---|
| 6,611,590 B1* | 8/2003 | Lu et al. .................... | 379/265.09 |
| 2002/0106071 A1* | 8/2002 | Uppaluru et al. .......... | 379/265.02 |
| 2009/0051752 A1* | 2/2009 | Lammers .................... | 348/14.01 |
| 2009/0067612 A1* | 3/2009 | Chevalier .................. | 379/265.09 |
| 2010/0226490 A1* | 9/2010 | Schultz et al. ............ | 379/265.09 |
| 2010/0331021 A1* | 12/2010 | Bushnell ...................... | 455/466 |

* cited by examiner

*Primary Examiner* — Simon King
(74) *Attorney, Agent, or Firm* — Andres F. Arrubla; Victor Siber

(57) ABSTRACT

Techniques for improving customer relationship management are disclosed. The techniques may be realized via a call processing system that may efficiently rout an incoming call to an agent of a call center. Also, the call processing system may provision a telephone number to a web-based help desk call center. Further, the call processing system may include a communication framework enabling a communication between a plurality of browser windows and a local storage medium.

6 Claims, 10 Drawing Sheets

620

| General Settings | Greetings | Call History | Call Dashboard |

Enable Voice?  ● Yes  ○ No
Enabling voice allows end-user to reach an available agent or leave a voicemail if no agents are available ▶ Phone number   (510) 222-4018
This is your Zendesk phone number. Customers can call this number directly. Alternatively, redirect support calls to this number from your existing phone system

| 0 |
| 5 |
| 10 |
| 15 |
| 20 |
| Unlimited |

Maximum queue size   [None ▼]
New calls that exceed this limit are directed to voicemail Maximum queue wait time   [1 minute ▼]
Callers who want longer than this time limit are directed to voicemail

| 1 minute |
| 2 minute |
| 3 minute |
| Unlimited |

Only route calls during business hours?   ● Yes  ○ No
Enabling this option will only route calls to available agents during your account's configured business hours. Congfigure your business hours.

Ticket #603                    660

▽ Steven Yan via MAILAPITESTERCHANGED - edit / share    Sep-08 16 32    ☏ 503-564-4035    ▽ apply macro Subject
Phone Call from Steven Yan Status      Type      Priority         Group           Assignee*              Time Taken*
Open ◁▷    ◁▷        ◁▷              Managers ◁▷     Steven Agent ◁▷

More                                                                          Checkbox
                                                                              ☐
Tags ☏ Phone Call from Steven Yan

▽        ○─────────── 00:24  ||||

Call Details
   Call from: 408-314-8190
   Time of call: Sept-08 2011  04:32:42pm
   Answered by: MAIL APITESTERCHANGED
   Length of phone call: 24 seconds Latest comments by MAILAPITESTERCHANGED less than a minute ago ○  ☐ Requester and CCs can see this comment (public comment)

Attach file
                                      Updated ticket (ctrl-s) ◁▽   (Submit)

TECHNIQUES FOR CUSTOMER RELATIONSHIP MANAGEMENT

CROSS-REFERENCE TO RELATED APPLICATIONS

This patent application claims priority to U.S. Provisional Patent Application No. 61/533,252, filed Sep. 11, 2011, which is hereby incorporated by reference herein in its entirety.

FIELD OF THE DISCLOSURE

The present disclosure relates generally to a call processing system and, more particularly, to techniques for a call processing system to improve management of customer relationship.

BACKGROUND

Call centers, such as Automatic Call Distribution or ACD systems, are employed by many enterprises to service customer. A typical call center includes a switch and/or server to receive and route incoming packet-switched and/or circuit-switched calls and one or more resources, such as human agents and automated resources (e.g., Interactive Voice Response (IVR) units), to service the incoming calls. Call centers rely upon expensive dedicated hardware and infrastructure and require agents to be present at the call center to answer calls. Also, call centers distribute calls, whether inbound or outbound, for servicing to any suitable resource according to predefined criteria. In many existing systems, the criteria for servicing the calls from the moment that the call center becomes aware of the contact until the call is connected to an agent are customer-specifiable (i.e., programmable by the operator of the contact center), via a capability called vectoring. Normally in present-day ACDs when the ACD system's controller detects that an agent has become available to handle a contact, the controller identifies all predefined contact-handling skills of the agent (usually in some order of priority) and delivers to the agent the highest-priority oldest call that matches the agent's highest-priority skill. Agents with a higher skill are normally preferred over agents with lower skill levels when assigning an agent to a call. When agents have multiple skills, the controller is more likely to select a call for which the agent has a high skill level over a contact for which the agent has a lesser skill level. Generally, the only condition that results in a call not being delivered to an available agent is that there are no contacts waiting to be handled.

Acquisition and installation of call center systems require dedicated expensive hardware, full-time IT management oversight and knowledge of telecommunication infrastructure. Implementation of such call center systems may take weeks or months. One current system uses a telephone circuit switch to receive calls and signaling into a network. The telephone circuit switch processes the called number to generate and transmit a first query to a Service Control Point (SCP). The SCP processes the first query to generate a second query to a routing processor at a call center. The routing processor at the call center responds to the SCP with routing information, and the SCP responds to the telephone circuit switch with the routing information. The telephone circuit switch then extends the call to another telephone circuit switch connected to the call center based on the routing information. This other telephone circuit switch then transfers the call to the call center over a dedicated Time Division Multiplexing (TDM) line, such as an Integrated Services Digital Network (ISDN) connection. This transfer includes a transfer of the called number. Routing equipment at the call center must process the called number to internally route the call to the destination within the call center. This system is deficient because it forces the routing equipment at the call center to handle dialed number processing. It also does not allow the efficient utilization of packet-based transport technologies.

During a call, an agent may have many browser windows open. Normally, communication between browser windows may be achieved via window handles—a reference to a child browser window held by a parent browser window. For example, when a parent browser window opens a child browser window, the parent browser window stores a reference of the child browser window and may use different functions to communicate with the child browser. However, if the main window is closed or reloaded, the reference is lost and thus communication with the child browser window is lost.

In view of the foregoing, it may be understood that there may be significant problems and shortcomings associated with current call processing system technologies.

SUMMARY

Techniques for a call processing system to improve management of customer relationship are disclosed. In one particular embodiment, the techniques may be realized as a system for communicating between browsers windows. The system may include a main browser window opened in response to a call and a client browser window opened in response to the main browser window. The system may also include a communication framework in communication with the main browser window and the client browser window and a local storage medium in communication with the communication framework configured to store a key value reference from at least the client browser window.

In another embodiment, the techniques may be realized as a method for routing a call. The method may include receiving, via a call processing system, a call from a user device via a communication network and determining, via the call processing system, a group of available agents to answer the call. The method may also include determining, via the call processing system, an agent from the group of available agents that has longest idle time, and routing, via the call processing system, the call to the agent that has the longest idle time.

In other embodiments, the techniques may be realized as a method for provisioning a telephone number. The method may include receiving, via a call processing system, a request to create a call center and assigning, via the call processing system, a telephone number to the call center. The method may also include configuring, via the call processing system, one or more parameters of the call center and receiving, via the call processing system, calls via the telephone number of the call center.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

FIGS. 6A-G show a flow diagram of provisioning a web-based help desk call center by a call processing system in accordance with an embodiment of the present disclosure.

DETAILED DESCRIPTION

Figure 1:
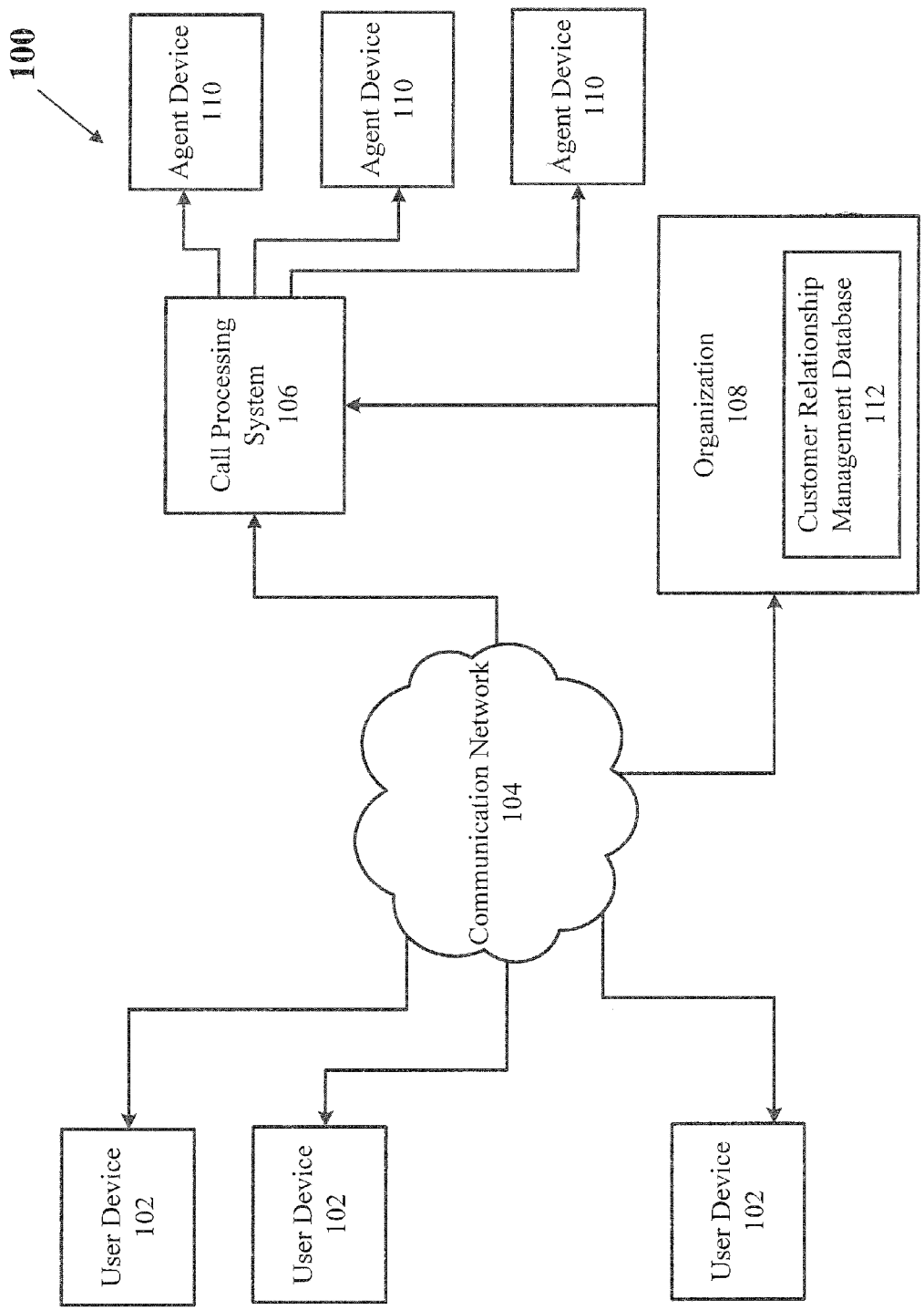
FIG. 1 shows a customer relationship management system in accordance with an embodiment of the present disclosure.

Referring to FIG. 1, there is shown a customer relationship management system in accordance with an embodiment of the present disclosure. The customer relationship management system 100 may include a plurality of user device 102 (1-N) communicate with an agent device 110 via a call processing system 106, an organization 108 and a communication network 104. For example, a user may use the user device 102 to place a call to the calling processing system 106 and/or the organization 108 via the communication network 104. The call processing system 106 and/or the organization 108 may route the call to an agent device 110. The user may inquire services or require assistance provided by the call processing system 106 and/or the organization 108. The organization 108 may include a customer relationship management database 112 that may store customer information. The call processing system 106 integrates on-demand help desk software and customer support portal solution based on Internet (e.g., Web 2.0) technologies and design philosophies in order to process calls placed by the plurality of user devices 102 (1-N). The call processing system 106 provides a seamless integration of the back-end helpdesk software as a service (SaaS) to the organization's 108 online customer-facing web presence, include for example, but not limited to, email-ticket integration, online forums, rich site summary (RSS) and widgets. Also, the call processing system 106 may leverage Internet (e.g., Web 2.0) technologies on the backend, such as tag based categorization throughout the call processing system 106.

Although the call processing system 106 is shown as an independent system, the call processing system 106 may also be alternatively located entirely or partially on another system (e.g., the organization 108 or the agent device 110) or a secondary system. This secondary system may include a database, server, or the like that connects to the communication network 104 and provides the functionality described herein.

The user devices 102 may be a mobile user device, a computer, a personal computer, a laptop, a cellular communication device, a workstation, a mobile device, a phone, a television, a handheld PC, a personal digital assistant (PDA), a thin system, a fat system, a network appliance, an Internet browser, or other any other device that may be in communication with the call processing system 106 via the communication network 104. Other user devices 102 may be one or more intermediary devices that may communicate with the communication network 104, such as a transmitter/receiver, router, modem, or a set-top box. The user devices 102 may be coupled to the call processing system 106 via a wired link. In another exemplary embodiment, the user devices 102 may be coupled to the call processing system 106 via a wireless link.

The communication network 104 may couple the plurality of user devices 102(1-N) to the call processing system 106 and/or the organization 108. The communication network 104 may be a wireless network, a wired network or any combination of wireless network and wired network. For example, the communication network 104 may include one or more of a fiber optics network, a passive optical network, a cable network, an Internet network, a satellite network (e.g., operating in Band C, Band Ku or Band Ka), a wireless LAN, a Global System for Mobile Communication (GSM), a Personal Communication Service (PCS), a long term evolution (LTE), a Personal Area Network (PAN), D-AMPS, Wi-Fi, Fixed Wireless Data, IEEE 802.11a, 802.11b, 802.15.1, 802.11n and 802.11g or any other wired or wireless network for transmitting and receiving a data signal. In addition, the communication network 104 may include, without limitation, telephone line, fiber optics, IEEE Ethernet 802.3, wide area network (WAN), local area network (LAN), or global network such as the Internet. The communication network 104 may support an Internet network, a wireless communication network, a cellular network, or the like, or any combination thereof.

The communication network 104 may further include one, or any number of the exemplary types of networks mentioned above operating as a stand-alone network or in cooperation with each other. Although the communication network 104 is depicted as one network, it should be appreciated that according to one or more embodiments, the communication network 104 may comprise a plurality of interconnected networks, such as, for example, a service provider network, the Internet, a broadcaster's network, a cable television network, corporate networks, and home networks.

The call processing system 106 may include one or more servers. For example, the call processing system 106 may include a UNIX based server, Windows 2000 Server, Microsoft IIS server, Apache HTTP server, API server, Java sever, Java Servlet API server, ASP server, PHP server, HTTP server, Mac OS X server, Oracle server, IP server, or other independent server to support operations of a client. Also, the call processing system 106 may include one or more Internet Protocol (IP) network server or public switch telephone network (PSTN) server. The call processing system 106 may include one or more databases for storing a network model topology and network policies based at least in part on the network model topology.

The organization 108 may include one or more servers to provide service to the plurality of user devices 102(1-N) via the communication network 104. For example, the organization 108 may include a UNIX based server, Windows 2000 Server, Microsoft IIS server, Apache HTTP server, API server, Java sever, Java Servlet API server, ASP server, PHP server, HTTP server, Mac OS X server, Oracle server, IP server, or other independent server to provide one or more contents to the plurality of user devices 102(1-N). Also, the organization 108 may include one or more Internet Protocol (IP) network server or public switch telephone network (PSTN) server.

The organization 108 may include one or more storage devices including, without limitation, paper card storage, punched card, tape storage, paper tape, magnetic tape, disk storage, gramophone record, floppy disk, hard disk, ZIP disk, holographic, molecular memory. The one or more storage devices may also include, without limitation, optical disc, CD-ROM, CD-R, CD-RW, DVD, DVD-R, DVD-RW, DVD+R, DVD+RW, DVD-RAM, Blu-ray, Minidisc, HVD and Phase-change Dual storage device. The one or more storage devices may further include, without limitation, magnetic bubble memory, magnetic drum, core memory, core rope memory, thin film memory, twistor memory, flash memory, memory card, semiconductor memory, solid state semiconductor memory or any other like mobile storage devices.

The agent devices 110 may be a mobile user device, a computer, a personal computer, a laptop, a cellular communication device, a workstation, a mobile device, a phone, a television, a handheld PC, a personal digital assistant (PDA), a thin system, a fat system, a network appliance, an Internet browser, or other any other device that may be in communication with the call processing system 106. Other agent devices 102 may be one or more intermediary devices that may communicate with the call processing system 106, such as a transmitter/receiver, router, modem, or a set-top box. The agent devices 102 may be coupled to the call processing system 106 via a wired link. In another exemplary embodiment, the user devices 102 may be coupled to the call processing system 106 via a wireless link.

The customer relationship management database 112 may include one or more storage devices including, without limitation, paper card storage, punched card, tape storage, paper tape, magnetic tape, disk storage, gramophone record, floppy disk, hard disk, ZIP disk, holographic, molecular memory. The one or more storage devices may also include, without limitation, optical disc, CD-ROM, CD-R, CD-RW, DVD, DVD-R, DVD-RW, DVD+R, DVD+RW, DVD-RAM, Blu-ray, Minidisc, HVD and Phase-change Dual storage device. The one or more storage devices may further include, without limitation, magnetic bubble memory, magnetic drum, core memory, core rope memory, thin film memory, twistor memory, flash memory, memory card, semiconductor memory, solid state semiconductor memory or any other like mobile storage devices. The customer relationship management database 112 may include customer information including, but not limited to, name, address, telephone number, email address, services provided, past inquires, occupation, income and/or other information associated with the customer.

Figure 2:
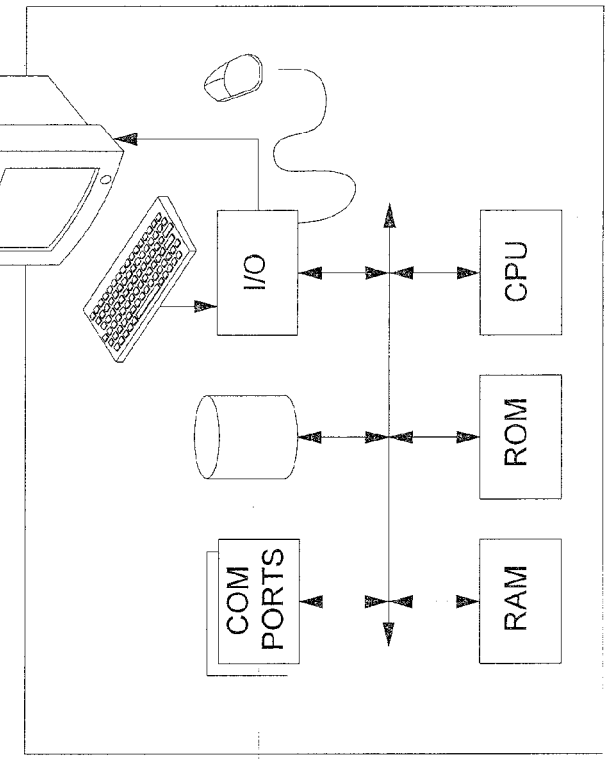
FIGS. 2 and 3 show functional block diagrams of a user device and/or a call processing system in accordance with an embodiment of the present disclosure.
Figure 3:
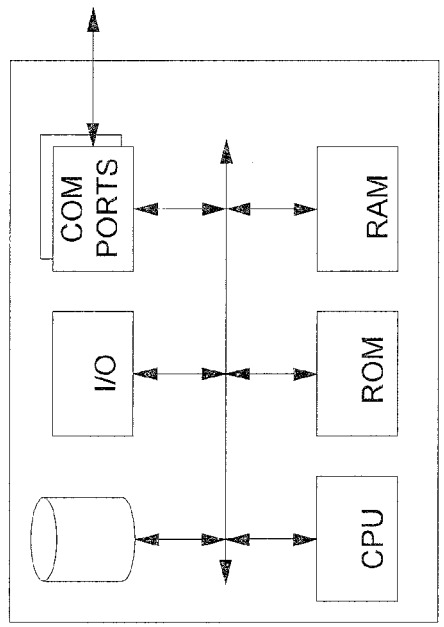

Referring to FIGS. 2 and 3, there are shown functional block diagram of a user device 102 and a call processing system 106 in accordance with an embodiment of the present disclosure. FIGS. 2 and 3 provide functional block diagram illustrations of general purpose computer hardware platforms. FIG. 2 illustrates a network or host computer platform of the call processing system 106, as may typically be used to implement a server or other network element (e.g., a web server). The call processing system 106 may include a communication port 202 in communication with the communication network 104. Also, the call processing system 106 may include an Input/Output (I/O) port 204, a computer processing unit (CPU) or processor 206, a read-only memory 208 and a random access memory 210. Various components of the call processing system 106 may be communicatively coupled to each other via a communication bus 212. FIG. 3 depicts a computer with user interface elements, as may be used to implement a personal computer (PC) or other type of work station or terminal device of a user device 102, although the computer of FIG. 3 may also act as a server if appropriately programmed. The user device may include a communication port 302 in communication with the communication network 104. Also, the user device 102 may include an Input/Output (I/O) port 304, a computer processing unit (CPU) or processor 306, a read-only memory (ROM) 308 and a random access memory (RAM) 210. Various components of the user device 102 may be communicatively coupled to each other via a communication bus 312. Those skilled in the art are familiar with the structure, programming and general operation of such computer equipment and as a result the drawings should be self-explanatory.

The hardware elements, operating systems and programming languages of such computers are conventional in nature, and it is presumed that those skilled in the art are adequately familiar therewith. Of course, the server functions may be implemented in a distributed fashion on a number of similar platforms, to distribute the processing load.

Hence, aspects of the disclosed techniques can be executed on a network element such as a server. Program aspects of the technology may be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another computer or processor. For example, software and/or instructions may be communicated from a server to a client. Similarly, software for a server may be loaded into the hardware platform or platforms selected to perform that server function. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable non-transitory medium" refer to any medium that participates in providing instructions to a processor for execution.

Hence, a machine readable non-transitory medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the data aggregator, the customer communication system, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Figure 4:
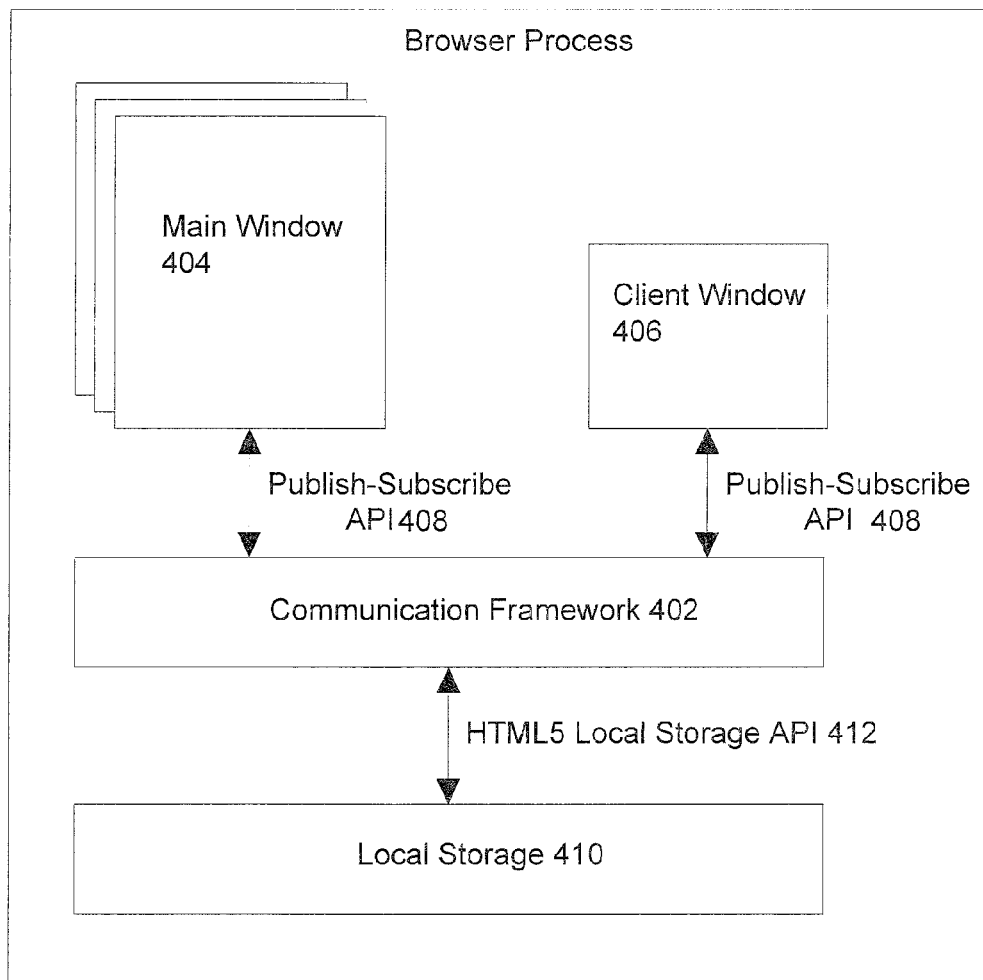
FIG. 4 shows a publish-subscribe communication framework of a call processing system in accordance with an embodiment of the present disclosure.

Referring to FIG. 4, there is shown a publish-subscribe communication framework of a call processing system 106 in accordance with an embodiment of the present disclosure. The call processing system 106 may include a publish-subscribe communication framework 402. The publish-subscribe communication framework 402 may communicate with a main browser window 404 and a client browser window 406 via the publish-subscribe communication framework application programming interface (API) 408 for an event-driving communications. The publish-subscribe communication framework 402 may be communicatively coupled to a local storage area 410 via a local storage application programming interface (API) 412. The publish-subscribe communication framework 402 of the call processing system 106 may use local storage events to transmit information between a plurality of browser windows. The publish-subscribe communication framework 402 of the call processing system 106 may listen and/or trigger local storage events. For example, during a call to the call processing system 106, an agent answering the call may have a plurality of browser windows (e.g., the main window browser 404 and the client window browser 406) open in order to answer the call. The publish-subscribe communication framework 402 of the call processing system 106 may store a key value reference for data to the local storage area 410 of the user device 102, the processing system 106, or a computing device of the agent during browser window or webpage reloads. The publish-subscribe communication framework 402 may cause the local storage area 410 to trigger events when data are written to the local storage area 410. The triggered events may be broadcasted to all browser windows that may be subject to normal same-origin constraints.

In an exemplary embodiment, hypertext markup language (HTML) local storage API 412 (e.g., HTML5) may be used to communicate between the publish-subscribe communication framework 402 and the local storage area 410. Also, HTML web storage may be used in storing data in the local storage area 410. The HTML web storage may be based on a key-value pair storage framework that provides behavior similar to cookies but with larger storage capacity and improved API. Data in the local storage area 410 may be stored based on a named key and retrieved with the same named key. The named key may be a string. The data stored in the local storage area 410 may be any type data supported by JavaScript, including strings, Booleans, integers, or floats. However, the data may be stored as a string. When data are stored in formats other than string, functions (e.g., parseInt( ) or parseFloat( )) may be used to coerce the retrieved data into the expected JavaScript data type.

```
interface Storage {
    getter any getItem(in DOMString key);
    setter creator void setItem(in DOMString key, in any data);
};
```

Calling setItem( ) with a named key that already exists will silently overwrite the previous value. Calling getItem( ) with a non-existent key will return null rather than throw an exception. Like other JavaScript objects, the localStorage object may be treated as an associative array. Instead of using the getItem( ) and setItem( ) methods, square brackets may be used. For example, this snippet of code:

```
var foo = localStorage.getItem("bar");
// . . .
localStorage.setItem("bar", foo);
```

Also, the snippet of code may be rewritten to use square bracket syntax instead:

```
var foo = localStorage["bar"];
// . . .
localStorage["bar"] = foo;
```

The value for an assigned named key may be removed and the entire local storage area 410 may be cleared (e.g., deleting all keys and values at once).

```
interface Storage {
    deleter void removeItem(in DOMString key);
    void clear( );
};
```

However, calling removeItem( ) may not affect a non-existent key. Also, a total number of values in the local storage area 410 may be obtained and iterate through all of the keys by index (to get the name of each key).

```
interface Storage {
    readonly attribute unsigned long length;
    getter DOMString key(in unsigned long index);
};
```

If a key( ) function is called of a data having an index that is not between 0-(length −1), the function may return null.

To keep track of when the local storage area 410 changes, storage event may be trapped. The storage event may be triggered on the window object when setItem( ), removeItem( ), or clear( ) functions are called and the local storage area 410 is changed. For example, if an item is set to its existing value or call clear( ) when there are no named keys, the storage event will not trigger, because nothing changed in the local storage area 410.

The storage event may be supported everywhere the localStorage object is supported including Internet Explorer® 8. For example, the Internet Explorer® 8 does not support the W3C standard addEventListener. Therefore, in order to trigger the storage event, event mechanism that a browser supports may be checked. In an exemplary embodiment, jQuery function or some other JavaScript library may be used to register storage event handlers and/or storage events.

```
if (window.addEventListener) {
    window.addEventListener("storage", handle_storage, false);
} else {
    window.attachEvent("onstorage", handle_storage);
};
```

The handle storage callback function may be called with a StorageEvent object, except in Internet Explorer® where the storage event object is stored in window.event.

```
function handle_storage(e) {
  if (!e) { e = window.event; }
}
```

Figure 5A:
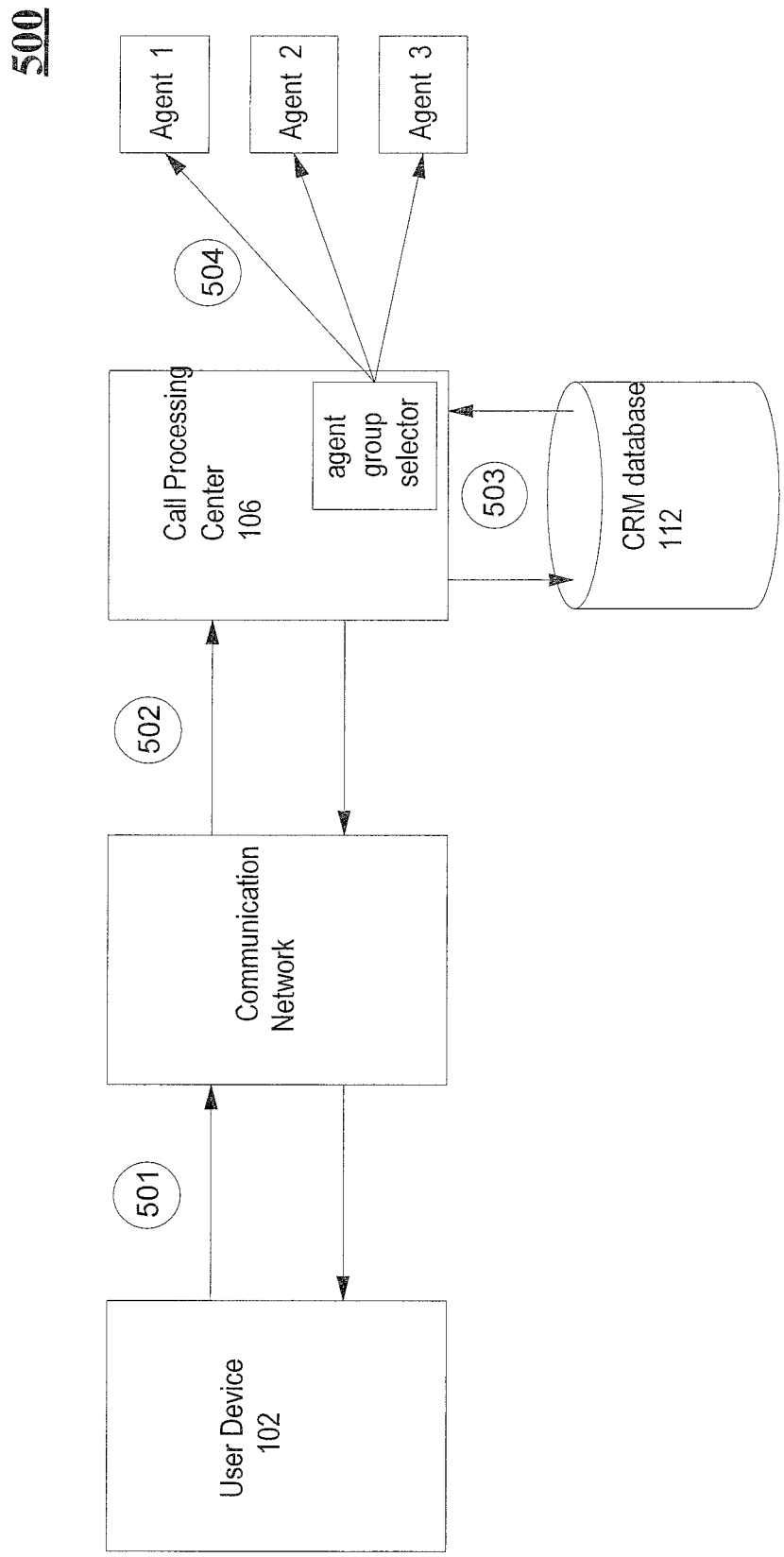
FIGS. 5A-B show a flow diagram of managing agent availability and routing of call of a call processing system in accordance with an embodiment of the present disclosure.
Figure 5B:
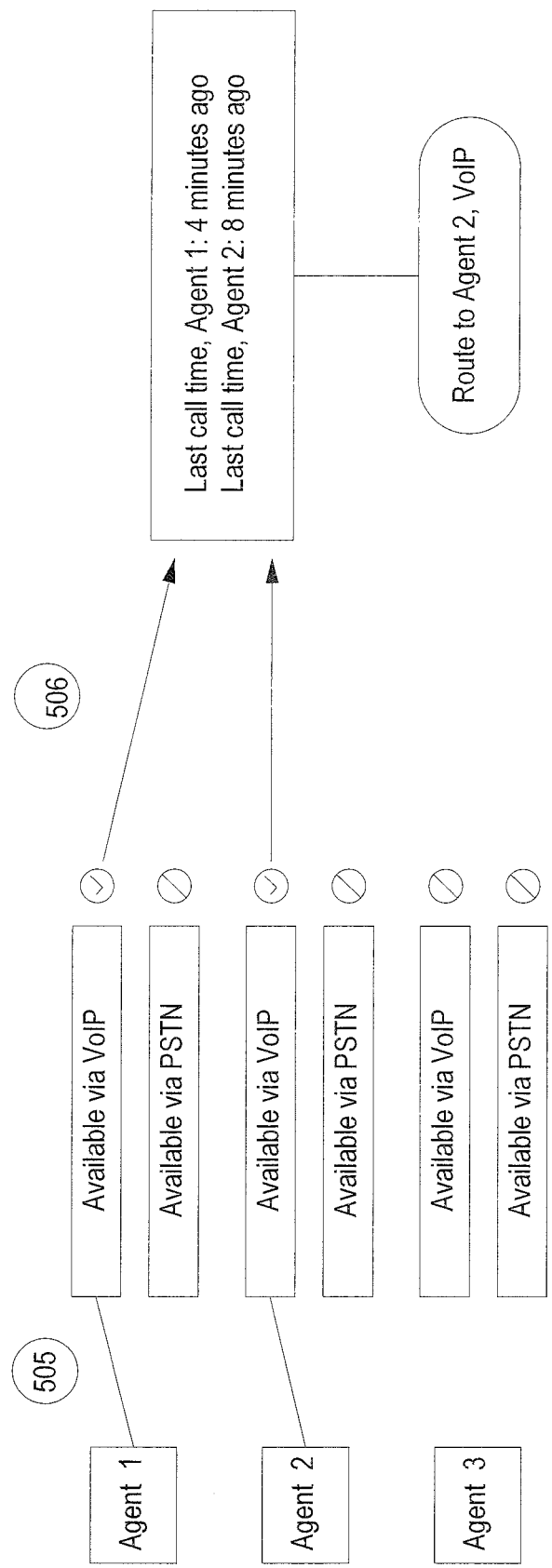

FIGS. 5A-B show a flow diagram of managing agent availability and routing of call of the call processing system 106 in accordance with an embodiment of the present disclosure. This exemplary method 500 may be provided by way of example, as there are a variety of ways to carry out the method. The method 500 shown in FIGS. 5A-B can be executed or otherwise performed by one or a combination of various systems. The method 500 is described below may be carried out by the systems and network shown in FIGS. 1-4, by way of example, and various elements of the system and network are referenced in explaining the example method of FIGS. 5A-B. Each step shown in FIGS. 5A-B represents one or more processes, methods or subroutines carried out in exemplary method 500. Referring to FIGS. 5A-B, exemplary method 500 may begin at step 1.

The call processing system 106 may perform intelligent switching between voice over Internet Protocol (VoIP) and public switched telephone network (PSTN) availability for call center support agents. Also, the call processing system 106 may enable support agents to accept phone calls either through a web-based embedded phone client or devices associated with a PSTN telephone number. The call processing system 106 may intelligently detect and prioritize VoIP availability through detection of agent presence at a window browser. The call processing system 106 may determine that an agent is not available at a window browser and rout a call for the unavailable agent to a secondary PSTN telephone number and allowing the unavailable agent to continue accepting calls while not at the window browser (e.g., primary place of work using a browser session for VoIP-based communication). The call processing system 106 allows for the use of low-cost VoIP-based communication for call sessions and the secondary PSTN telephone number improves agent availability (e.g., physically unavailable or network outage).

At step 501, a user may use a user device 102 to place a call to the call processing system 106 via the communication network 104. In an exemplary embodiment, the user may use a telephone to call the call processing system 106.

At step 502, the communication network 104 may route the call from the user device 102 to the call processing system 106. In an exemplary embodiment, the communication network 104 may include a PSTN that may route the call from the user device 104 to the call processing system 106.

At step 503, the call processing system 106 may process the call. For example, the call processing system 106 may gather information based at least in part on the telephone number associated with the call. In an exemplary embodiment, customer information may be stored in a customer relationship management database 112 or the organization 108. The customer information may be indexed based on various characteristics of the customer. For example, the customer information may be indexed based on telephone number, name, address, email, IP address or other characteristics of the customer. The call processing system 106 may gather customer information from the customer relationship management database 112 based at least in part on the telephone number of the call. The call processing system 106 may attach the customer information to the call.

At step 504, the call processing system 106 may route the call to an available agent. For example, the call processing system 106 may verify whether agents are available. The call processing system 106 may determine all available agents that may answer the call.

At step 505, the call processing system 106 determine whether the agents are available via a VoIP device (e.g., browser window) or a PSTN device (e.g., telephone). For example, the call processing system 106 may determine whether an agent is available via VoIP by detecting whether the agent is present at a VoIP browser window. In an exemplary embodiment, an agent may switch off the VoIP browser window and the call processing system 106 may determine that the agent is not available at the VoIP device and may be available at a PSTN device. In another exemplary embodiment, an agent may switch on the VoIP browser window and the call processing system 106 may determine that the agent is available at the VoIP device.

At step 506, the call processing system 106 may select an agent from the group of available agents based at least in part on a characteristic of the agent. For example, the call processing system 106 may select an agent that may had been idle the longest from the group of available agents to handle the call. Also, the call processing system 106 may select an agent that may be most qualified from the group of available agents to handle the call. In another example, the call processing system 106 may select an agent that may have handled previous calls from the customer from the group of available agents to handle the call.

FIGS. 6A-G show a flow diagram of provisioning a web-based help desk call center by a call processing system in accordance with an embodiment of the present disclosure. The call processing center 106 may provision a new telephone number to a call center through standard representation state transfer (REST) API to telecommunication providers. The call processing center 106 may create a web-based call center workflow that may enable instant availability for agents who may accept calls. For example, the call processing center 106 may create a window browser that may allow an agent to answer a call within the window browser and thus obviates the need for expensive telecommunication infrastructure for routing calls to agents. The call processing system 106 may create a support ticket for each call in order to audit and track telephone conversations.

Figure 6A:
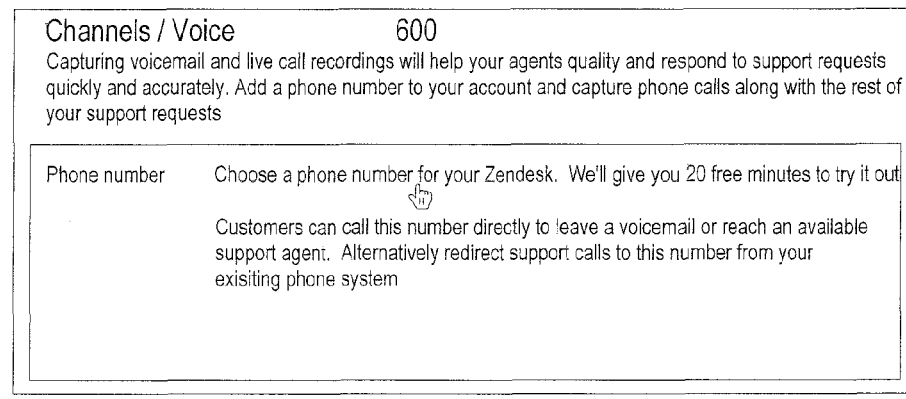

FIG. 6A shows the call processing system 106 to provision a telephone number to a new call center. For example, the call processing system 106 may provide a web application 600 that may allow a call center administrator to create a telephone number for the call center. The call center administrator may click on a "Phone number" icon and the call processing system 106 may allow the call center administrator to select a telephone number for the call center.

Figure 6B:
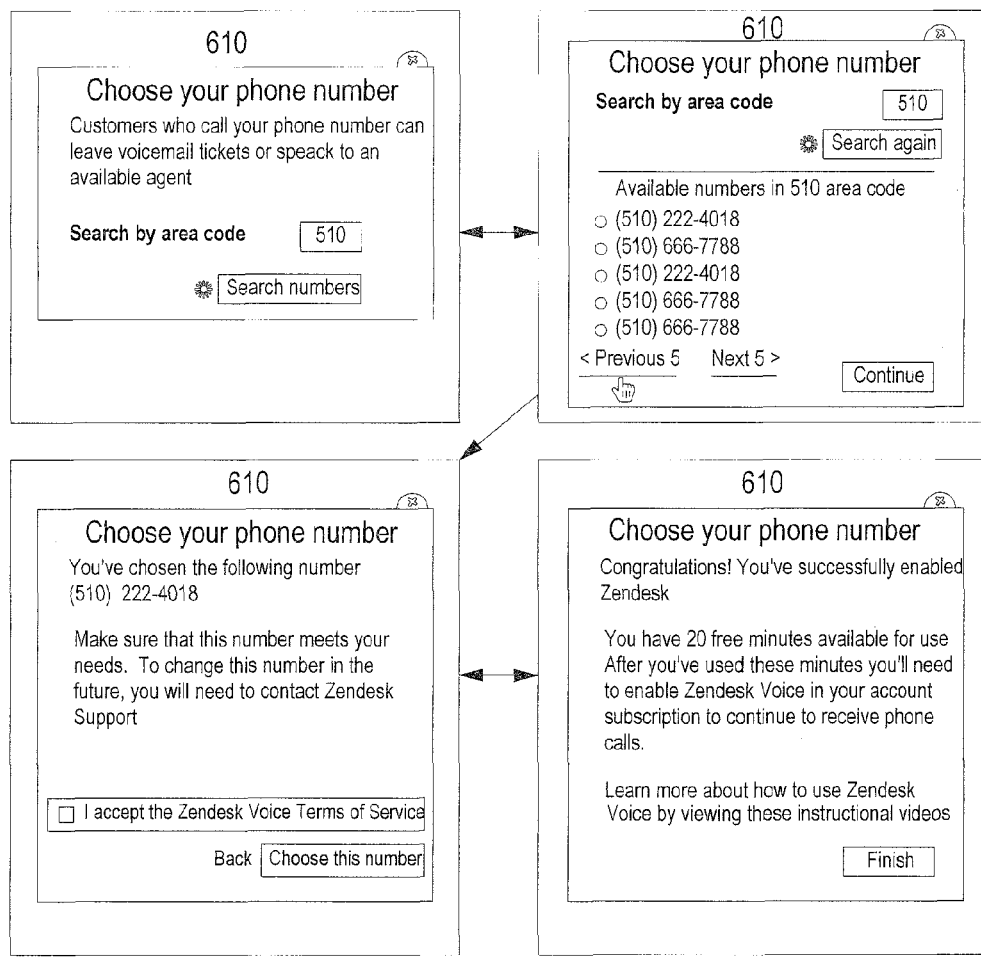

FIG. 6B shows the call processing system 106 providing a web-interface 610 to guide the call center administrator to select a telephone number for the call center. For example, the call center administrator may select or input an area code (e.g., 510) and the call processing center 106 may provide one or more available telephone numbers that are available in the inputted area code. The call center administrator may select a desired telephone number and the call processing center 106 may prompt the call center administrator to agree to the terms and conditions for using the service provided by the call processing center 106. The call processing center 106 may also provide a confirmation that a telephone number has been provisioned to the call center and the call center administrator may start using the telephone number to receive calls.

FIG. 6C shows the call processing system 106 providing a web-interface 620 to allow the call center administrator to configure a web-based help desk via a call center configuration window in order to accept calls. For example, the call center configuration window may include one or more tabs (e.g., General Settings, Greetings, Call History, and Call Dashboard) that may the call center administrator to configure the web-based help desk. In an exemplary embodiment, the call center administrator may configure several parameters (e.g., enable voice, phone number, maximum queue size, maximum queue wait time and routing of call) of the call center under the General Settings tab. The enable voice parameter may allow an end user to reach an available agent or leave a voicemail if no agents are available. The phone number parameter may allow a customer to call a telephone number directly or redirect support call to the telephone number. The maximum queue size parameter may limit a number of calls waiting in a queue of the call center. The maximum queue wait time parameter may limit the time a caller is allowed to wait in queue before the caller is directed to a voicemail. The routing call parameter may enable routing of calls to available agents during a predetermined time period (e.g., business hour).

Figure 6D:
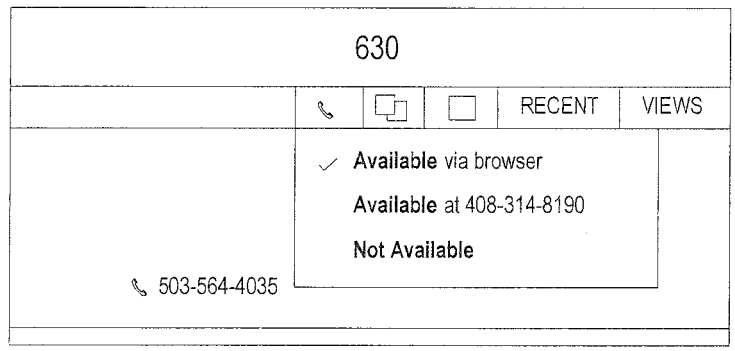

FIG. 6D shows that the call processing system 106 providing a web-interface 630 to allow agents to make themselves available to answer calls. For example, an agent may selectively indicate an availability to answer calls via a window browser or a secondary telephone number. Also, an agent may selectively indicate that he/she is not available.

Figure 6E:

FIG. 6E shows a notification 640 of an incoming call by the call processing system 106. For example, the call processing system 106 may provide a notification window of an incoming call to an agent. The notification window may include information of an agent selected to answer the calling, including for example, but not limited to, a telephone number, name, email address, number of tickets and other information of the agent. The agent may select decide whether to accept or decline to answer the call.

Figure 6F:

FIG. 6F shows creation of a ticket 650 by the calling processing system 106 after an agent accept to answering a call. For example, the calling processing system 106 may create a ticket for an incoming call after an agent accepts to answer the call. The ticket may include recording of the telephone call. The ticket may also include information of the call and/or the agent.

FIG. 6G shows a call log window 660 associated with a ticket by the call processing system 106. The call processing system 106 may create a call log window of a ticket in order to record telephone calls. The call log window of a ticket may include subject of the call, status, type, priority, group, assignee, time take, checkbox, tags, phone recordings, comments and other information associated with the call.

Figure 7:
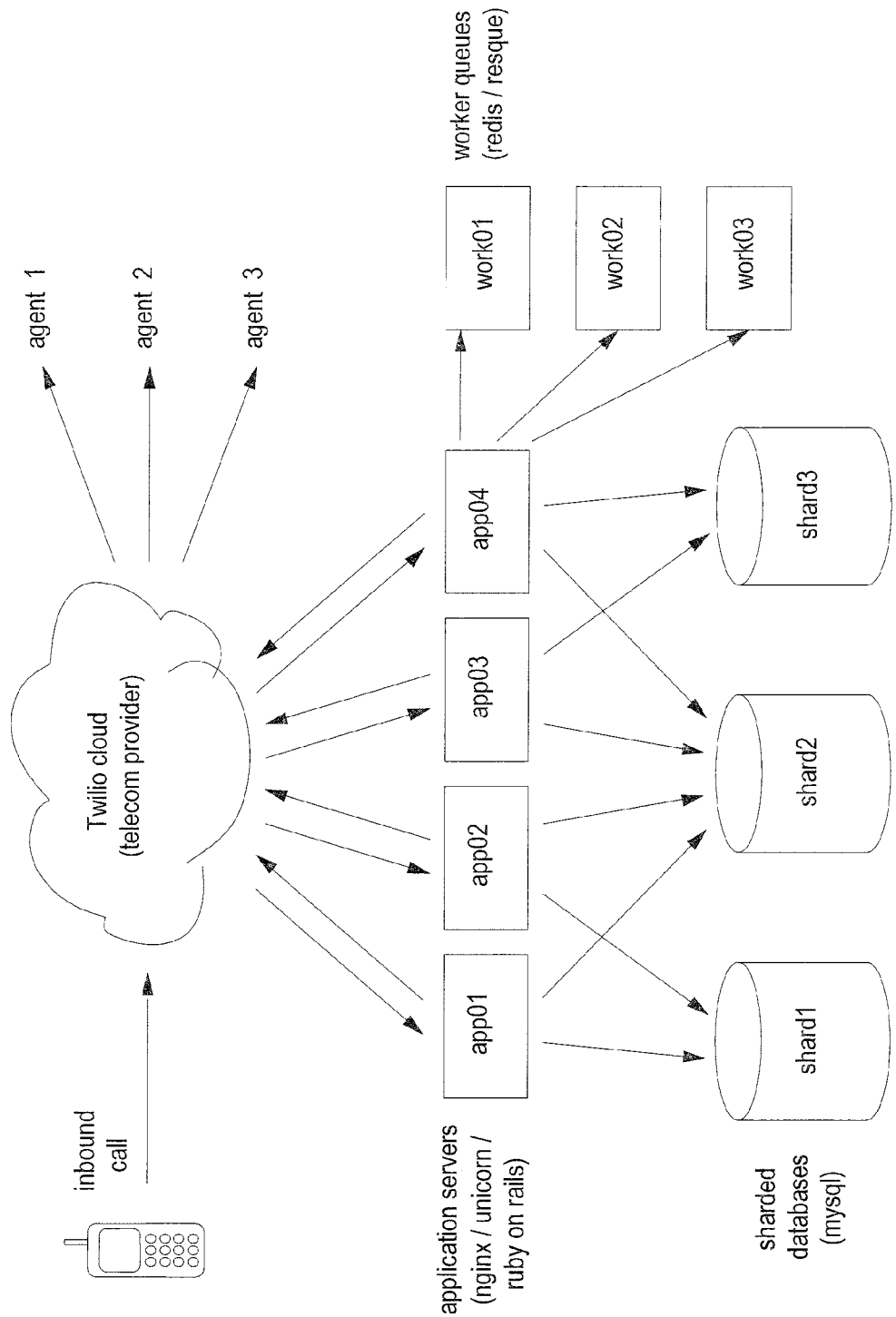
FIG. 7 shows a system architecture of a call processing system in accordance with an embodiment of the present disclosure.

FIG. 7 shows a system architecture of a call processing system 106 in accordance with an embodiment of the present disclosure. The system architecture of the call processing system 106 allows for browser window-based help desk call center provision and management of VoIP/PSTN availability switching for a call center agent. Aspects of the call processing system 106 are described in U.S. patent application Ser. No. 12/417,630, which are incorporated by reference. The system architecture of the call processing system 106 may include various hypertext transfer protocol (http) features. For example, the hypertext transfer protocol (http) features may include, but not limited to, serving static, index files, auto-indexing; open file descriptor cache; accelerated reverse proxying with caching; simple load balancing, fault tolerance; accelerated support with caching of remote FastCGI servers, simple load balancing and fault tolerance. In other examples, the hypertext transfer protocol (http) features may include name-based and IP-based virtual servers, keep-alive and pipelined connections support, flexible configuration, reconfiguration and online upgrade without interruption of the client processing, access log formats, buffered log writing, and quick log rotation, 3xx-5xx error codes redirection, a rewrite module, access control based on client IP address, basic authentication, the PUT, DELETE, MKCOL, COPY and MOVE methods, FLV streaming, speed limitation, limitation of simultaneous connections or requests from one address and embedded perl.

The system architecture of the call processing system 106 may exhibit a modular architecture. The system architecture of the call processing system 106 may include filters having zipping, byte ranges, chunked responses, XSLT, SSI, and image resizing filter. Multiple SSI inclusions within a single page can be processed in parallel if they are handled by FastCGI or proxied servers. SSL and TLS SNI support.

The call processing system 106 may include a Unicorn HTTP server for Rack applications designed to serve fast clients on low-latency, high-bandwidth connections and take advantage of features in Unix/Unix-like kernels. While slow clients should only be served by placing a reverse proxy capable of fully buffering both the request and response in between Unicorn HTTP server and slow clients. The Unicorn HTTP server of the call processing system 106 may be debugged with ease, while eliminating nginx or Rack. The Unicorn HTTP server of the call processing system 106 may reap and restart workers that die from broken applications. The call processing system 106 may eliminate the need to manage multiple processes or ports. The call processing system 106 may spawn and manage any number of worker processes that are selected to scale a backend. Load balancing may be performed entirely by the operating system kernel of the call processing system 106 and thus requests may not pile up behind a busy worker process. The call processing system 106 may support all Rack applications, along with pre-Rack versions of Ruby on Rails via a Rack wrapper. The call processing system 106 may allow logrotate to rotate files automatically and quickly via rename by built-in reopening of all log files via USR1 signal. The call processing system 106 may take steps to ensure multi-line log entries from one request to stay within the same file. The call processing system 106 may allow nginx-style binary upgrades without losing connections. The call processing system 106, applications, libraries and Ruby interpreter may be upgrade without dropping clients. The call processing system 106 may be used with a copy-on-write-friendly memory management to save memory (by setting "preload_app" to true). The call processing system 106 may listen on multiple interfaces including UNIX sockets, each worker process can also bind to a private port via the after_fork hook for easy debugging.

The call processing system 106 may decode chunked transfers on-the-fly, thus allowing upload progress notification to be implemented as well as being able to tunnel arbitrary stream-based protocols over HTTP. In another example, the call processing system 106 may include a redis store that is an open source, advanced key-value store. The call processing system 106 may also include a resque library that is a Redis-backed Ruby library for creating background jobs, placing them on multiple queues, and processing them later. The resque library may allow for creating background jobs, placing those jobs on multiple queues, and processing them later. Background jobs can be any Ruby class or module that responds to perform.

A variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as FPGA, PLD, PLA or PAL or any other device or arrangement of devices that is capable of implementing the steps of the process of the present disclosure.

It is appreciated that in order to practice the method of the present disclosure as described above, it is not necessary that the processors and/or the memories of the processing machine be physically located in the same geographical place. That is, each of the processors and the memories used in the present disclosure may be located in geographically distinct locations and coupled so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

In the system and method of the present disclosure, a variety of "user interfaces" may be utilized to allow a user to interface with the processing machine or machines that are used to implement the present disclosure. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method for provisioning a telephone number, comprising:
    receiving, via a call processing system, a request to create a call center from an organization;
    assigning, in response to the organization's request and via the call processing system, a telephone number to the call center using a web interface;
    configuring, via the call processing system, one or more parameters of the call center;
    receiving, via the call processing system, a call via the telephone number assigned to the call center; and
    providing, via the call processing system, a second web-interface window configured to allow an agent to answer the call.

2. The method of claim 1, wherein assigning a telephone number includes displaying, via the web interface, one or more available telephone numbers available according to a selected or inputted area code.

3. The method of claim 1, wherein assigning a telephone number further comprises providing the organization a confirmation that the assigned telephone number has been provisioned to the call center.

4. The method of claim 1, wherein the one or more parameters are configured by the organization and further include at least one of a maximum queue wait time, and routing the call during a predetermined time period.

5. The method of claim 1, further comprising creating a ticket after an agent accepts the call.

6. The method of claim 5, wherein the ticket includes a recording of the call.

* * * * *